United States Patent [19]
Holbrook

[11] 3,854,191
[45] Dec. 17, 1974

[54] METHOD OF MAKING FLUID COLLECTION RECEPTACLES

[75] Inventor: Legrand K. Holbrook, Salt Lake City, Utah

[73] Assignee: Medical Development Corporation, Salt Lake City, Utah

[22] Filed: May 25, 1973

[21] Appl. No.: 363,849

Related U.S. Application Data
[63] Continuation-in-part of Ser. No. 98,566, Dec. 16, 1970, Pat. No. 3,738,381.

[52] U.S. Cl. .................................. 29/453, 264/328
[51] Int. Cl. .............................................. B23p 11/02
[58] Field of Search ....... 29/453; 215/1 C; 264/318, 264/328; 425/247; 137/199, 205

[56] References Cited
UNITED STATES PATENTS

| | | | |
|---|---|---|---|
| 2,677,855 | 5/1954 | Mallory | 264/328 X |
| 2,799,435 | 7/1957 | Abplanap | 264/328 X |
| 3,363,626 | 1/1968 | Bidwell et al. | 141/59 X |
| 3,559,647 | 2/1971 | Bidwell | 141/59 X |
| 3,586,031 | 6/1971 | Muller | 137/199 |
| 3,601,140 | 8/1971 | Hooper | 137/205 X |
| 3,603,366 | 9/1971 | Albizati | 215/1 C X |

*Primary Examiner*—Charlie T. Moon

[57] ABSTRACT

A method of fabricating a fluid collection bottle or container having as a fundamental concept a provision of integral port extensions molded in the principal port of the over-all container construction. Positive and negative, intercooperating molds are provided, and this with pin means and corresponding alignment aperature means whereby, with the slideable cooperation of such pin means and the alignment aperture means, the positive and negative molds may be strictly maintained on centerline, thereby insuring uniform wall thickness of the container produced. Subsequent to the formation of the container, a closure member is provided at that end of the container remote from the so-formed ports.

4 Claims, 6 Drawing Figures

PATENTED DEC 17 1974
3,854,191
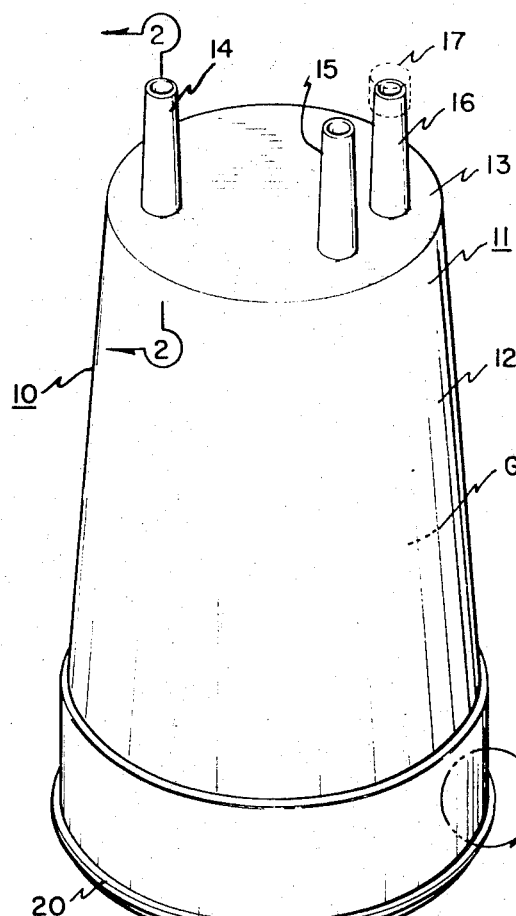
FIG.1
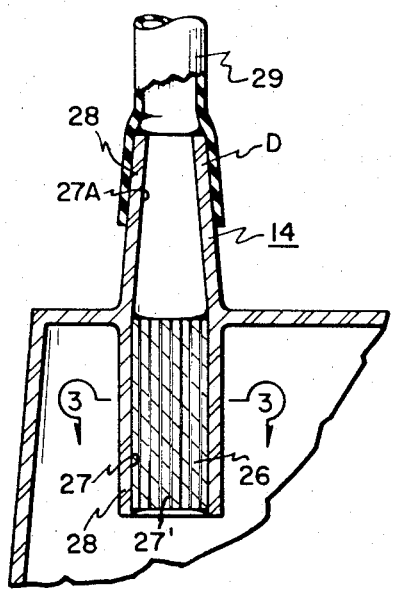
FIG.2
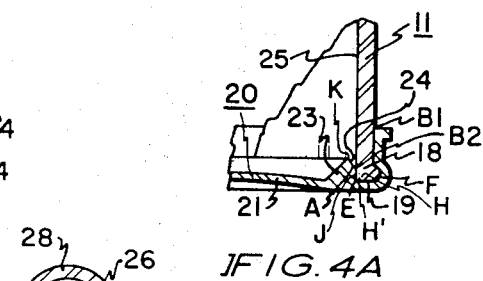
FIG.4A
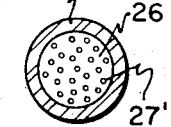
FIG.3
FIG.4B
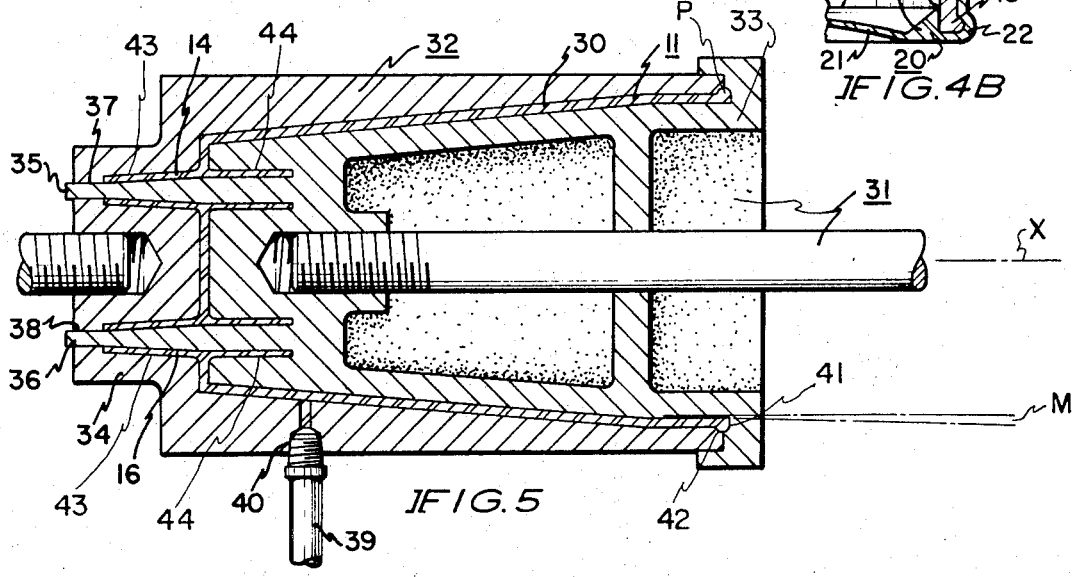
FIG.5

METHOD OF MAKING FLUID COLLECTION RECEPTACLES

This is a continuation-in-part of United States Patent application entitled, "Inverted Fluid Collection Receptacle," Ser. No. 98,566, filed Dec. 16, 1970, now U.S. Pat. No. 3,738,381.

The present invention relates to liquid containers having one or more ports and, more particularly, to an improved method of fabricating such containers whereby, in the fabrication process, the principal container part is made to have insured, uniform wall thickness, while the guide means employed to effect such result simultaneously forms the ports to be provided. Closure means is used to enclose the remaining extremity of the container so that the latter serves as a base, the ports being upstanding.

In connection with any vacuum operated device, particularly those in use in medical fields, a prime consideration is to preserve uniformity of wall thickness in the device. This avoids chances of collapse or breakage of the containers at weakened wall areas where non-uniformity in wall thickness exists. As a general rule, for currently produced, cup-configured devices the male or positive mold used in fabricating the device frequently becomes off-center or askew relative to the female or negative mold. Concentional cup-configured objects do not have holes in their bottoms or bases. The present invention reverses this general approach by in fact providing ports in the base, termed the "top" in the specification hereinafter, of such a container device. The ports are preferably made elongate so as to project on opposite sides of the base or top formation. Such port inclusion permits the pins forming the interior wall of the ports to serve also as guide pins for cooperable guide apertures disposed in the female or negative mold used in fabricating the device. In this way, continuous centerline positioning of the male mold relative to the female mold is assured by virtue of the pins and cooperating guide apertures associated proximate the port area of the container. This avoids the difficulty of the male mold being misaligned, either initially or through the use, off-center or askew relative to the central axis of the negative mold employed in fabricating the device.

The molds employed herein also are designed such that a top bead or formed upper lip can be provided the container, this for providing a snap-fit engagement with a lid designed for positionment thereover.

The molding structure supplies a desired draft angle so that the molds may be easily separated upon the initial curing of the plastic container formed by the molds in a conventional injection molding process.

In the present invention, then, the method of making fluid receiving containers comprises the steps of providing positive and negative molds designed for intercooperation and, at the time of the injection molding process, simultaneously providing the ports, and this in such a manner that guide pins and chambers intercooperate to form the ports and simultaneously hold the molds on centerline.

Accordingly, a principal object is to provide a new method of manufacturing fluid-receiving containers.

A further object is to provide a new method of fabricating fluid receiving containers wherein the ports formed also facilitate, by mold structure, the holding on centerline of such mold structures so that uniform wall thickness of the container to be fabricated is achieved.

An additional object is to provide a new method of manufacture of liquid-receiving containers intended to have ports, this wherein the positive and negative molds used to form the container likewise, in their being mutually drawn together, provide intercooperating regestration via intended port apertures to that such molds are held on centerline.

The features of the present invention which are believed to be novel are set forth with particularity in the appended claims. The present invention, both as to its organization and manner of operation, together with further object and advantages thereof, may best be understood by reference to the following description taken in connection with the accompanying drawings in which:

FIG. 1 is a perspective view of an enclosure member constructed in accordance with the present invention.

FIG. 2 is an enlarged fragmentary vertical section taken along the line 2—2 in FIG. 1, illustrating the deposition of a valve device within the vacuum port of the enclosure structure.

FIG. 3 is a horizontal cross-section taken along the line 3—3 in FIG. 2.

FIG. 4A is an enlarged fragmentary vertical section of a portion of the enclosure structure of FIG. 1, illustrating the cooperation of the bottom cover with the lip of the enclosure member of the structure before a reduced pressure condition is caused to exist within the enclosure.

FIG. 4B illustrates the structure of FIG. 4A once a reduced pressure condition is produced within the enclosure member of the invention.

FIG. 5 is a longitudinal, vertical section of molding structure which can be used in forming the enclosure member of the container structure of the invention.

In FIG. 1 the receptacle device 10 of the present invention is shown to include an enclosure member 11 having side wall 12 and a top 13 integral therewith. The latter is provided with a series of ports, identified as vacuum port 14, fluid inlet port 15, and a tandum connection port 16. These ports are parallel to each other and to the longitudinal axis X of the enclosure member. Port 16 may be capped by a cap 17 when not in use. Provision of the tandem connection port 16 is to accommodate external valving or external tandem connections when plural ones of the receptacles 10 are to be connected together in tandem to and between a vacuum- or reduced air-pressure producing source, i.e., a vacuum pump, and a source of fluid supply.

The enclosure member 11 is also shown in FIG. 4A to include a lip 18 defining an open base E and being provided with an outwardly extending annular bead F. The lip 18 cooperates with an interior receiving groove 19 associated with the liquid sealing bottom cover 20. See lip P in FIG. 5.

Bottom cover 20 is shown to include a bottom portion 21 which is preferably slightly concave in its nominal configuration. A rim portion 22 is contiguous with bottom portion 21 in the manner illustrated in FIGS. 4A and 4B.

Integrally formed with bottom portion 21 of bottom cover 20 is an interiorly protuding, annularly disposed sealing portion 23. The same has an outside, preferably conically formed surface 24 of which portion H is a sloped continuation, in the manner shown by the dotted line, before the bottom cover 20 is snapped onto the lip of enclosure member 11. Enclosure member 11 is composed of harder material, e.g. acrylic polystyrene "SAN," than the medium density polyethylene preferably comprising bottom cover 20. Thus, when the bottom cover 20 is snapped onto enclosure member 11, portion H' of sealing portion 23 will be compressed inwardly such that there will exist a compression sealing juncture J, existing even before a vacuum is applied. Once a reduced pressure condition is produced within the enclosure, then upper portion K of sealing portion 23 will also be disposed against the innter side wall surface 25. See FIG. 4B.

In sum, when the bottom cover 20 is snapped onto the lip of the enclosure member 11, a seal will exist from point B1 to B2. When a vacuum is applied, the bottom cover 20 will tend to become drawn inwardly relative to the enclosure member, in a manner indicated in FIG. 4B, so that the upper portion at K of sealing surface 24 will also engage the inner wall 25 of enclosure member 11, to point C. When, because of the applied vacuum, liquid enters via port 15, by way of example, the liquid will fall onto the bottom cover 20 so that there will be a slight tendency of the bottom cover 20 to return downwardly to re-open the angle A. However, the common juncture seal from J to point B1 will continue.

There shall next be considered the inclusion of a differential valve device 26 in those ports, such as vacuum port 14, which are to be utilized as vacuum ports, that is, to be connected to a reduced gaseous pressure source such as a vacuum pump. In the embodiment shown the device 26 is simply a perforate plug, cylindrical in form, see FIG. 3, and is pressed into the interior 26 of the lower extension 28 of vacuum port 14.

The device takes the form of a styrofoam plug which is perforated by a series of small holes 27'. Where the fluid to be introduced in the container device 10 is blood or blood containing body fluids, then the holes 27 should be of such a size that they will fit or can be produced by, say, a 20 gauge needle. A series of closely spaced needles may be easily used in a die to punch simultaneously the holes 27' in the plug or valve device.

Of importance in FIG. 2 is the fact that the interior 27A of the vacuum port 14 is tapered. This is for a first purpose of providing a constriction for the valve device or plug 26 such that the same will not proceed into, let alone out of, the vacuum port 14 toward the vacuum producing source. Additionally, the tapered interior 27A provides for uniform wall thickness at D and a tapered exterior at 28, which exterior can accommodate either an elastomeric vacuum conduit tube 29 or some other conduit device provided with a Leur fitting.

As to the construction shown in FIG. 2, it will be observed that when a vacuum is applied as by conduit 29, fluid to be drawn into enclosure member 11 will proceed through the fluid inlet port 15 and into the enclosure G as defined by enclosure member 11 and the liquid sealing bottom cover 20. Parenthetically, it is to be observed that the bottom cover 20, preferably made of a medium density polyethylene, will be sufficient to produce quite an effective vacuum seal at the juncture 19, and most certainly will be effective for fluid once the same is contained therewithin. The strength of the bottom cover should be such that the weight of the fluid will not tend to depress significantly the configuration of bottom cover 20 from that condition shown in FIG. 4B.

FIG. 5 indicates a method of fabrication of enclosure member 11, whereby in insure that the wall thickness at 30 of enclosure member 11 is preserved. One prior method of making cup-configured enclosures is simply to provide positive and negative mold to form the space defining the cup-configuration. Normally, such misalignments as may occur between the positive and negative molds are not objectionable since uniformity of wall thickness is not critical. In the case of vacuum operated containers, however, it is essential in order to preserve the configuration against collapse of a portion of the wall, due to non-uniformity of wall thickness, that the positive and negative molds be maintained strictly on centerline during the injection molding process associated with fabrication of the container.

It is noted that all of the design features of the enclosure member 11 in combination with bottom cover 20 co-act together to great advantage. FIG. 5 illustrates that positive and negative molds 31 and 32 are respectively provided with mold members 33 and 34. These are suitably configured and provided with a mold withdrawal draft angle M as shown in FIG. 5, to form the enclosure member as well as the elongate ports 14 and 16. Note that since the ports, e.g. 14 and 16, are included the same can be formed by pins 35 and 36 which are integral with mold member 33. But these are also used as guide pins which proceed into corresponding guide apertures 37 and 38, respectively, of mold member 34; hence, the cooperation of the pins and guide apertures 35–38 assure that the positive mold 31 will be maintained on centerline with respect to the negative mold 32, thereby insuring the uniformity of wall thickness 30 relative to enclosure member 11. Accordingly, there is assured the condition of uniformity of wall thickness so that a changing of collapse of the container at any weakened area, weakened because of an inadvertently produced reduced wall thickness, is avoided. Mold members 33 and 34 are recessed at 41 and 42 to provide for container bead or lip 43.

The bottom cover 20, in being disposed at the bottom rather than at the top of the container, insures that a vacuum seal need be produced only for a limited time, that is, for the time required to introduce fluid into the container. Once liquid is at the bottom of the container, then a vacuum seal, strictly speaking, is not required. However, it must be noted that an extremely effective seal for all fluids is produced by virtue of the interconnection between bottom cover 20 and enclosure member 11. Especially is this true in the case of the provision of annular protrusion 23 which acts as an effective seal against the interior wall of enclosure member 11, when a vacuum is applied, so as to draw upwardly the central portion of bottom portion 21 relative to the remainder of the closure structure. The ports 14–16, in being provided the top (or base portion) 13, serve ideally not only as conduit connections but also to accommodate pins 35 and 36, which pins assure uniformity in wall thickness relative to wall 30 of the enclosure member 11. Liquid plastic feed stock, of course, will be introduced via feed conduit 39 which is connected by threads or otherwise at 40 to the negative mold 32.

Accordingly, it is seen that the present invention has provided vacuum operable liquid enclosure structure which is ideally suited for the collection of liquids such as a patient's body fluid in a hospital. Special note is to be made that the differential valve device 26 is simply fixed, involves no moving parts, and serves as a block to liquid such as blood, whereas the small holes 27' in FIG. 3 permit the interior of the container or enclosure member 11 to be evacuated as before described.

As to enclosure-lid seal, it is seen that the seal is maximized when a vacuum seal is needed, that is, when the reduced pressure is initially applied to facilitate the drawing up of fluid for disposition within the container. Once the fluid or liquid drops into the container so as to cover the bottom, then so great a seal need not be continued. Hence, it is permissible for the weight of the liquid to restore to some degree the configuration of the bottom cover 20.

Should the receptacle construction be inverted, such that the ports are a part of the cover 20, then "bottom portion" 21 will simply be considered central portion of the cover 20.

Accordingly, it can be seen that the present invention as claimed comprises in essence a method of manufacturing containers wherein port extensions are automatically provided in the container structure. This is accomplished through use of positive and negative molds, with the two molds having inter-cooperating pin and guide aperture means serving not only, as to the pin means, for forming the ports, but also for providing guideway means whereby the positive and negative molds may be held on centerline.

This is believed to be the first instance in which, in injection molding techniques, containers are formed wherein the port extensions are self-contained, the molds being used in the method practiced such that an on centerline condition is maintained relative to such molds as the ports with their container being formed. Once the molding of the container part is completed, then closure means is supplied to the open end of the container as by a snap it or other means so that such closure means may comprise the base of the over-all container structure.

In FIG. 5, the port extensions 14 and 16, both interior and exterior of the container, are shown to be formed by the provision of recesses or grooves 43 and 44, the former being contiguous with guide bores or apertures 37, and 38.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A method of making a container structure, said method comprising the steps of: molding a container having a port-including, upper, closed end, a peripheral side wall integral therewith, plural port extensions integral with said closed end and having molded wholly-open interiors, and an open, bottom, remaining end provided with an annular exterior snap-mount bead by using positive and negative molds having mutually facing molding surfaces configured to provide a container of uniform side-wall thickness, said positive mold including guide pins forming the inner surfaces of said port extensions and also serving to register said positive mold with said negative mold, said negative mold including guide pin apertures receiving said guide pins and recess means defining boundaries of said port extensions; providing a closure base having an interior snap-mount recess; and then snap-mounting said closure base via said snap-mount bead and recess in a liquid seal engagement with respect to said remaining end.

2. The method of claim 2 wherein said molding step comprises injection molding said container through keyed, mutually advanceable molds.

3. The method of claim 1 wherein in said molding step said upper closed end, peripheral side wall, and port extensions are simultaneously formed.

4. A method of making a container structure comprising a container and a base closure member engaging the former, said method comprising the steps of: molding a container, having an open end, in the manner of simultaneously molding through positive and negative molds a peripheral side wall, an upper closed end integral therewith, an exterior base snap bead, and plural, exteriorly extending, wholly-open port extensions integral with said upper closed end and communicating with the interior of said container, said peripheral side wall being assured of uniform wall thickness through such method step including mold-keying means passing through said port extensions for keying the mutual movement of said molds mutually together and apart; providing a closure base having an interior snap recess; and then fastening said closure base at said snap bead and recess in a liquid seal engagement with respect to said open end.

* * * * *